US006690265B2

United States Patent
Hagstrum

(10) Patent No.: US 6,690,265 B2
(45) Date of Patent: Feb. 10, 2004

(54) INFRASOUND HAZARD-WARNING METHOD AND DEVICE FOR ALERTING NIGHT-MIGRATING BIRDS TO OBSTACLES

(75) Inventor: Jonathan Tryon Hagstrum, Menlo Park, CA (US)

(73) Assignee: The United States of America as represented by the Department of the Interior, Washington, DC (US)

( * ) Notice: Subject to any disclaimer, the term of this patent is extended or adjusted under 35 U.S.C. 154(b) by 0 days.

(21) Appl. No.: 10/000,446

(22) Filed: Dec. 4, 2001

(65) Prior Publication Data

US 2003/0102964 A1 Jun. 5, 2003

(51) Int. Cl.[7] .............................. G08B 3/10; G08B 3/00; G08B 23/00; G08B 25/08
(52) U.S. Cl. ................................ 340/384.3; 340/384.1; 340/573.1; 340/692; 367/139; 119/713
(58) Field of Search ........................... 340/384.4, 384.2, 340/573.1, 692; 367/139; 43/1; 119/713

(56) References Cited

U.S. PATENT DOCUMENTS

| | | | | | |
|---|---|---|---|---|---|
| 4,284,845 A | * | 8/1981 | Belcher | ................... | 340/384.2 |
| 4,656,770 A | * | 4/1987 | Nuttle | .............................. | 43/2 |
| 4,736,907 A | * | 4/1988 | Steffen | ........................ | 244/1 R |
| 4,769,794 A | * | 9/1988 | Beuter et al. | ................ | 367/139 |
| 5,774,088 A | * | 6/1998 | Kreithen | ....................... | 342/22 |
| 6,250,255 B1 | * | 6/2001 | Lenhardt et al. | ............. | 119/713 |
| 6,285,630 B1 | * | 9/2001 | Jan | .............................. | 367/139 |

* cited by examiner

Primary Examiner—Jeffery Hofsass
Assistant Examiner—Lam Pham
(74) Attorney, Agent, or Firm—Mark Homer

(57) ABSTRACT

A hazard warning device for night-migrating birds is provided which warns the birds of the presence of a fixed structure or obstacle, e.g., a building or communications tower, against which the birds could collide during night-migration. The device includes a speaker affixed to the structure and a recorder connected to the speaker for, when activated, supplying to the speaker, for continuous broadcast thereby, an infrasonic signal which naturally causes the birds to avoid the structure. In one embodiment, the signal has a frequency close to that of a natural topographic feature and causes the birds to avoid the structure based on the workings of the innate navigational system of the birds. In another embodiment, the recorder supplies a signal which reproduces or mimics the sound of thunder and/or the sound of a lightning strike.

14 Claims, 1 Drawing Sheet

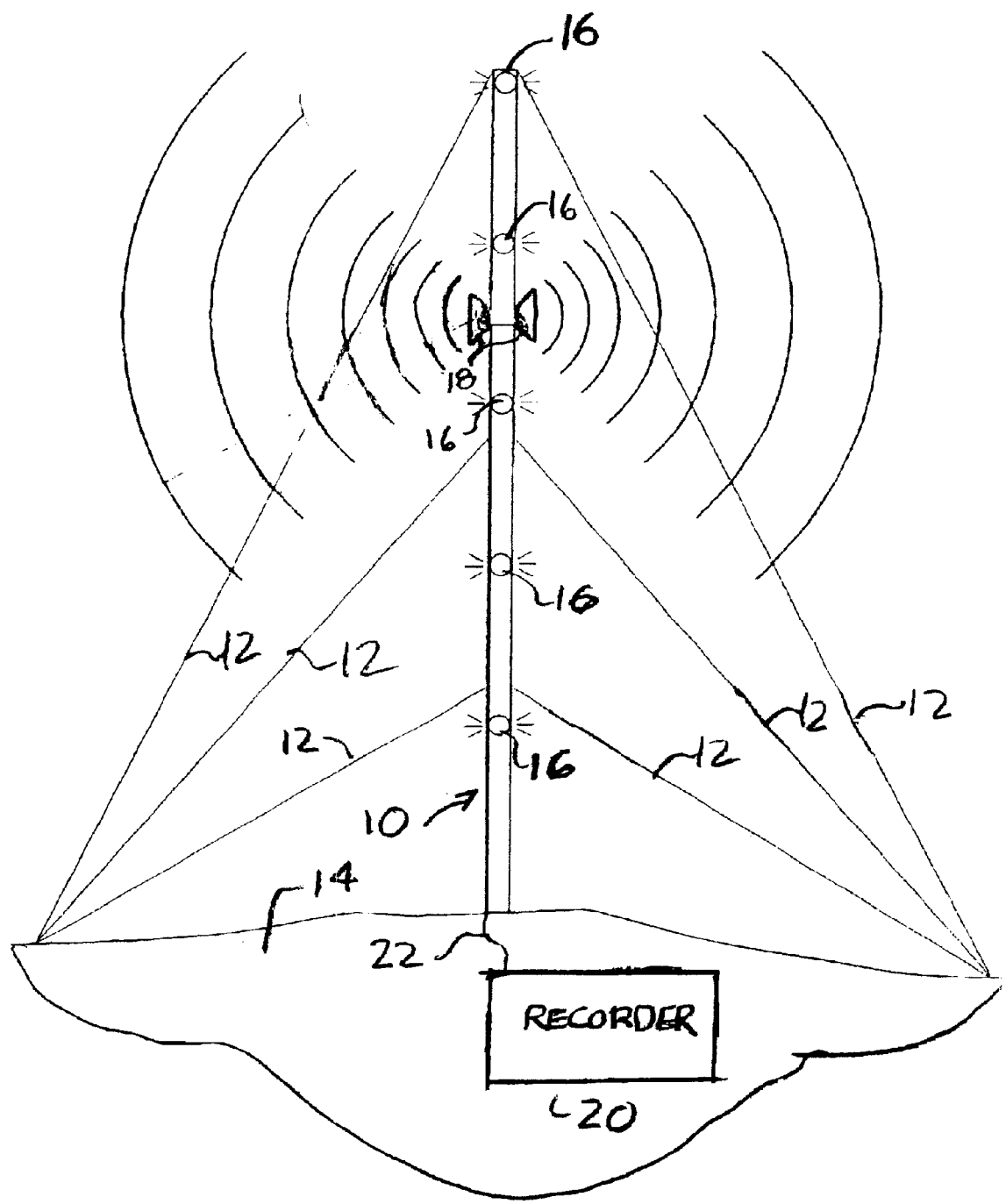

INFRASOUND HAZARD-WARNING METHOD AND DEVICE FOR ALERTING NIGHT-MIGRATING BIRDS TO OBSTACLES

BACKGROUND OF THE INVENTION

1. Field of the Invention

The present invention relates to the protection of birds that migrate at night and, more particularly, to an infrasound hazard warning device for that purpose.

2. The Related Art

A serious problem for night-migrating bird populations is collisions with buildings and communication towers, and this problem is expected to increase dramatically over the next two years. Television stations are expected to build as many as 100,000 tall towers (>200 ft) in the next decade to meet the mandate of the Federal Communication Commission to digitize all television stations by the year 2003. The cumulative impact of all towers and buildings on the migrating bird populations in North America pose a significant threat to their viability.

As far as the inventor is aware, there is no known method or device that effectively warns birds of buildings and tower locations and their potential hazard at night. The Federal Aviation Administration requires pilot warning lights on all towers over 20 ft. tall, but, unfortunately, the birds are attracted to these lights. Further, it has been found that red pulsating lights attract birds more than do white strobes.

SUMMARY OF THE INVENTION

A principle object of the invention is to warn the approximately 350 species of night-migrating songbirds in North America of obstacles in their path, particularly tall buildings and communication towers with pilot warning lights, so that the large numbers of fatalities which occur each year can be avoided.

As will appear, a key feature of the invention is the use of infrasound to mimic natural obstacles or lightning strikes that birds avoid naturally, due to the workings of their innate navigational system.

Previous work by the inventor on infrasound and the avian navigational map indicates that birds use infrasonic map cues radiated by steep-sided topographic features to navigate over great distances (hundreds to thousands of miles). Infrasonic signals travel thousands of miles in the atmosphere with little attenuation, and birds have extremely sensitive low-frequency hearing. Pigeons can detect sounds with frequencies as low as 0.05 Hz. Birds are able to navigate through mountain valleys and passes at night, or in other conditions of limited visibility, because they can detect the underlying topography from the infrasound radiated thereby.

The present invention is based on the inventive appreciation that if artificial obstacles or attached devices are made to radiate infrasound at the same frequency as natural topographic features, then night-migrating birds will avoid them in the same way as they would avoid colliding with, e.g., a hillside. An alternative embodiment is based on experiments that show that birds in flight react to and move away from artificially-generated thunder sounds. In accordance with this alternative embodiment, a method and device are provided for repeatedly radiating the sound of thunder at infrasonic frequencies. The device is attached to artificial obstacles to be avoided, e.g., buildings and communication towers, especially in conjunction with white strobe lights, so as to cause birds to avoid in-flight collisions with these artificial obstacles.

In accordance with a first aspect of the invention, there is provided a hazard warning device for night-migrating birds for warning the birds of the presence of a fixed structure against which the birds could collide during night-migration, the device comprising a speaker device affixed to the structure; and a recorder means connected to the speaker device for, when activated, supplying to the speaker device, for continuous broadcast thereby, an infrasonic signal which naturally causes the birds to avoid the structure.

According to one embodiment of this aspect of the invention, the recorder means comprises a recorder for supplying an infrasonic signal to the speaker device which causes the birds to avoid the structure based on the workings of the innate navigational system of the birds. Preferably, the signal has a frequency at least close to that of a natural topographic feature.

According to a further embodiment of this aspect of the invention, the recorder means comprises a recorder for supplying to the speaker device an infrasonic signal representative of a natural occurring weather threat to the birds. Preferably, the recorder supplies a signal which reproduces or mimics the sound of thunder and/or reproduces or mimics the sound of a lightning strike.

Advantageously, the speaker device comprises a sub-subwoofer and resonant cavity capable of broadcasting at frequencies of 0.1 to 50 Hz.

In accordance with a second aspect of the invention, there is provided a method for warning night-migrating birds of the presence of an obstacle against which the birds could collide during night migration, the method comprising: affixing a speaker device to the obstacle; and supplying to speaker device, for broadcast thereby, an infrasonic signal which naturally causes the birds to avoid the obstacle.

According to one embodiment of this aspect of the invention, the signal causes the birds to avoid the obstacle based on the workings of the innate navigational system of the birds. Preferably, the signal has a frequency at least close to that of a natural topographic feature.

According to a further embodiment of this aspect of the invention, the signal comprises an infrasonic signal representative of a natural occurring weather threat to the birds. Preferably, the signal reproduces or mimics the sound of thunder and/or reproduces or mimics the sound of a lightning strike. Advantageously, the signal is broadcast in conjunction with the strobing of white lights.

Further features and advantages of the present invention will be set forth in, or apparent from, the detailed description of preferred embodiments thereof which follows.

BRIEF DESCRIPTION OF THE DRAWINGS

The single feature in the drawings is a front elevational view of a radio tower incorporating a hazard warning system in accordance with a preferred embodiment of the invention.

DETAILED DESCRIPTION OF THE PREFERRED EMBODIMENTS

Referring to the single FIGURE of the drawings, a communication tower 10 is shown which is supported by a plurality of guy wires 12 on a ground surface 14. Tower 10 includes a plurality of pilot warning lights 16 spaced vertically along the length thereof. It will be understood that tower 10 with lights 16 is itself entirely conventional and, moreover, is intended to be representative of other obstacles such as tall buildings that can be hazardous to night-migrating birds.

In accordance with the preferred embodiment of the invention illustrated in the drawings, a sub-subwoofer speaker 18 capable of radiating a signal of 0.1–50 Hz is mounted on the tower 10. In accordance with a first aspect of this embodiment, a magnetic or digital recorder 20 is connected to the speaker 18 by a connecting cable 22. Recorder 20, when activated, is used to continuously play back a recorded natural infrasonic signal, i.e., a signal having a frequency below that of the auditory range of the human ear. As discussed above, radiation of the infrasound will cause night-migrating birds to avoid the tower 10 based on the working of their innate navigational system.

According to a further aspect of this embodiment, recorder 20 is used to supply an infrasonic signal to speaker 18 which mimics the sound of thunder and/or lightning strikes and thus similarly causes the birds to avoid the tower 10. As indicated above, this embodiment is particularly effective when used in conjunction with white strobe lights, and lights 16 can serve this purpose.

Although the invention obviously has other applications as discussed above, this invention is intended to be widely used across the USA and Canada to warn migratory birds of radio towers and buildings in their path, which cause a large number of fatalities every year (more than 4 million birds per year in North America).

Although the invention has been described above in relation to preferred embodiments thereof, it will be understood by those skilled in the art that variations and modifications can be effected in these preferred embodiments without departing from the scope and spirit of the invention.

What is claimed:

1. A hazard warning device for night-migrating birds for warning the birds of the presence of a fixed structure against which the birds could collide during night-migration, said device comprising:

a speaker device affixed to the structure; and a recorder means connected to said speaker device for, when activated, supplying to the speaker device, for continuous broadcast thereby, an infrasonic signal that mimics a natural obstacle which naturally causes the birds to avoid the structure.

2. A device according to claim 1 where said recorder means comprises a recorder for supplying said infrasonic signal to said speaker device for broadcast thereby which causes the birds to avoid the structure based on the workings of the innate navigational system of the birds.

3. A device according to claim 2 wherein said signal has a frequency at least close to that of a natural topographic feature.

4. A device according to claim 1 wherein said infrasonic signal mimics a natural occurring weather threat to the birds.

5. A device according to claim 4 wherein said signal mimics thunder.

6. A device according to claim 4 wherein said signal mimics a lightning strike.

7. A device according to claim 1 wherein said speaker device comprises a sub-subwoofer and resonant cavity capable of broadcasting at frequencies between 0.1 and 50 Hz.

8. A method for warning night-migrating birds of the presence of an obstacle against which the birds could collide during night migration, said method comprising:

affixing a speaker device to the obstacle; and supplying to said speaker device, for continuous broadcast thereby, an infrasonic signal that mimics a natural obstacle which naturally causes the birds to avoid the obstacle.

9. A method as claimed in claim 8 wherein said signal causes the birds to avoid the obstacle based on the workings of the innate navigational system of the birds.

10. A method as claimed in claim 8 wherein said signal has a frequency at least close to that of a natural topographic feature.

11. A method as claimed in claim 8 wherein said signal mimics a natural occurring weather threat to the birds.

12. A method as claimed in claim 11 wherein said signal mimics thunder.

13. A method as claimed in claim 11 wherein said signal mimics a lightning strike.

14. A method as claimed in claim 13 wherein said signal is broadcast in conjunction with the strobing of white lights.

* * * * *